United States Patent
Seto et al.

(10) Patent No.: US 6,858,553 B2
(45) Date of Patent: Feb. 22, 2005

(54) GLASS COMPOSITION

(75) Inventors: Hiromitsu Seto, Osaka (JP); Kosuke Fujiwara, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 75 days.

(21) Appl. No.: 09/964,506

(22) Filed: Sep. 28, 2001

(65) Prior Publication Data

US 2002/0068678 A1 Jun. 6, 2002

(30) Foreign Application Priority Data

Oct. 3, 2000 (JP) ........................... 2000-304017
Aug. 9, 2001 (JP) ........................... 2001-241950

(51) Int. Cl.$^7$ ................... C03C 3/087; C03C 3/091
(52) U.S. Cl. ................... 501/70; 501/71; 501/66; 501/64
(58) Field of Search ............... 501/66, 70, 71; 428/410

(56) References Cited

U.S. PATENT DOCUMENTS

| | | | | |
|---|---|---|---|---|
| 4,859,636 A | * | 8/1989 | Aratani et al. | 501/72 |
| 5,112,778 A | * | 5/1992 | Cheng et al. | 501/31 |
| 5,776,845 A | * | 7/1998 | Boulos et al. | 501/70 |
| 5,776,846 A | * | 7/1998 | Sakaguchi et al. | 501/70 |
| 5,837,629 A | | 11/1998 | Combes et al. | |
| 5,858,896 A | * | 1/1999 | Nagashima et al. | 501/66 |
| 6,046,122 A | * | 4/2000 | Nagashima et al. | 501/64 |

FOREIGN PATENT DOCUMENTS

| | | |
|---|---|---|
| EP | 0 849 233 | 6/1998 |
| EP | 0 867 415 | 9/1998 |
| FR | 2 699 529 | 6/1994 |
| JP | 3-187946 | 8/1991 |
| JP | 4-60059 | 9/1992 |
| JP | 6-53592 | 7/1994 |
| JP | 8-500811 | 1/1996 |

OTHER PUBLICATIONS

DATABASE WPI, section ch, week 198641, Derwent Publications Ltd., London, GB; AN 1986–269460, XP002188935 & JP 61–197444 A (Asahi Glass Co., Ltd.), Sep. 1, 1986.

DATABASE WPI, section ch, week 198749, Derwent Publications Ltd., London, GB; AN 1987–344162, XP002188936 & JP 62–246839 A (Central Glass Co., Ltd.), Oct. 28, 1987.

* cited by examiner

Primary Examiner—Karl Group
Assistant Examiner—Elizabeth A. Bolden
(74) Attorney, Agent, or Firm—Manabu Kanesaka

(57) ABSTRACT

A glass composition having excellent reinforcing capability and excellent solar control performance includes not smaller than 65 wt. % and smaller than 74 wt. % $SiO_2$, 0–5 wt. % $B_2O_3$, 0.1–2.5 wt. % $Al_2O_3$, not smaller than 0 wt. % and smaller than 2 wt. % MgO, 5–15 wt. % CaO, 0–10 wt. % SrO, 0–10 wt. % BaO wherein a total amount of MgO, CaO, SrO and BaO is greater than 10 wt. % and not greater than 15 wt. %, 0–5 wt. % $Li_2O$, 10–18 wt. % $Na_2O$, 0–5 wt. % $K_2O$ wherein a total amount of $Li_2O$, $Na_2O$, and $K_2O$ is 10–20 wt. % and 0–0.40 $TiO_2$.

10 Claims, No Drawings

GLASS COMPOSITION

FIELD OF THE INVENTION

The present invention relates to a glass composition which is excellent in reinforcing ability, particularly it relates to a glass composition to produce a reinforced glass having high surface compressive stress without intensified reinforcing process even with a thickness thinner than a conventional glass. Furthermore, it relates to a glass composition having excellent performance of controlling solar energy.

BACKGROUND OF THE INVENTION AND RELATED ART STATEMENT

Breakage of glass begins from the surface when the tensile stress arising on the surface of the glass because of the external force exceeds the tensile strength of the glass, except for unusual cases. The durability of the glass against the tensile stress is strongly affected by minute flows known as the "Griffith flaws" which exist on the surface of the glass. Therefore, in order to improve the durability, it is effective to provide a compressive layer to the glass surface so as to decrease the tensile stress arising from the external force, thereby preventing progress of the flaws. The compressive layer is formed by chemical reinforcements or physical reinforcements.

According to the physical reinforcements, the compressive layer is formed on the surface of glass in such a manner to cool the glass with high temperature to the room temperature at a high rate so as to stress the glass in the direction of the thickness thereof residually. As the physical reinforcements, air blast coolings are most widely put to practical use.

According to the air blast coolings, the glass is heated to around the softening temperature, and then the surface of the glass is cooled with compressed-air blast at a high rate to form the compressive layer on the surface and to form the tensile layer within the glass. As a result, the strength of the glass is improved.

It is known that the surface residual stress of the glass that arises from the air blast coolings depends on the temperature difference between the surface and the inner portion of the glass during the application of cooling. As the most simple approximation, when the glass with high temperature is cooled at a high rate, if the heat release Q is assumed to be constant, the maximum temperature difference between the surface and the inner portion of the glass $(\Delta\theta)\max$ is approximately determined from the following equation:

$$(\Delta\theta\max)=tQ/8k$$

wherein t is a thickness of the glass [m], Q is a heat release [W/m$^2$], k is a thermal conductivity [W/m·K].

Assuming that the time required to relax the strain is sufficiently short and the temperature gradient does not vary during the application of cooling, the surface compressive stress F of the glass with the ordinary room temperature is determined from the following equation:

$$F=\alpha\cdot E/(1-\sigma)\cdot 2/3\cdot(\Delta Q)\max$$

wherein $\alpha$ is a mean linear expansion coefficient, E is Young's modulus, and $\sigma$ is Poisson's ratio. The equation shows that the compressive stress F is increased by the increase of $\alpha$ and E.

Conventionally, the float glass plate employed for the window glass of the vehicle has a thickness from 3.5 to 4.8 mm. Recently, there has been strong demand to reduce the thickness of the window glass so as to decrease fuel cost by lightening the vehicle. However, assuming the area of the glass is the same, the glass is reduced in the heat capacity as the glass becomes thin, thus decreasing $(\Delta Q)\max$. As a result, the surface compressive stress F decreases. Therefore, some reinforced glasses are proposed so as to compensate for that.

A reinforced glass produced in accordance with a method for producing a reinforced glass disclosed in Japanese Patent (JP) publication H6-53592B is practically composed of (weight percent):
$SiO_2$:63–75%;
$Al_2O_3$:1.5–7%;
$TiO_2$:0–6%;
$Al_2O_3+TiO_2$:3–7%;
$MgO$:0–10%;
$CaO$:5–15%;
$MgO+CaO$:6–20%;
$Na_2O$:8–18%;
$K_2O$:0–5%; and
$Na_2O+K_2O$:10–20%,
and the glass has a liquidus temperature of equal to or less than 1150° C.

A glass to be reinforced easily disclosed in JP H4-60059B has the following composition (weight percent):
$SiO_2$:68–71%;
$Al_2O_3$:1.6–3.0%;
$MgO$:2.0–4.0%;
$CaO$:8.5–11.0%;
$Na_2O$:12.5–16.0%;
$K_2O$:0.9–3.0%,
wherein the total amount of these ingredients is equal to or more than 97%,
$SiO_2+Al_2O_3$:70.0–73.0%;
$MgO+CaO$:12.0–15.0%; and
$Na_2O+K_2O$:13.5–17.0%,
and a temperature at which the viscosity thereof grows to $10^9$ poise ranges 650 to 680° C. and a temperature at which the viscosity thereof grows to $10^{12}$ ranges 555 to 585° C., and the difference between these temperatures is in the range of 96 to 103° C.

A glass composition for manufacturing a transparent sheet glass disclosed in the PCT 8-500811 comprises;
69–75 wt. % $SiO_2$;
0–3 wt. % $Al_2O_3$;
2–10 wt. % $CaO$;
0–2 wt. % $MgO$;
9–17 wt. % $Na_2O$;
0–8 wt. % $K_2O$; and
0.2–1.5 wt. %$Fe_2O_3$, and furthermore comprises fluorine; oxides of zinc, zirconium, cerium and titanium; less than 4 wt. % barium oxide; and other oxides of alkaline earth metals wherein a total amount of the oxides of alkaline earth metals other than barium oxide is 10 wt. % or less.

Recently, a variety of glasses having an ultraviolet/infrared absorptivity and a greenish color shade to be used as a vehicle windshield have been proposed with the view of preventing degradation of luxurious interior materials and reducing the load of air conditioning of the vehicle.

For example, Japanese patent publication H3-187946A discloses a glass which has an ultraviolet transmittance of 38% or less, a solar energy transmittance of 46% or less, and a visible light transmittance of at least 70% in order to secure a field of vision from inside of a vehicle. As a color shade of these glasses for vehicles with greenish color shade, a greenish color shade tinged blue tends to be preferred.

It is known that the solar energy transmittance of a glass decreases when the amount of FeO in the total iron oxide which is added to the glass increases. Almost all of the infrared absorbent glasses which were proposed in the past use this method.

The aforementioned glass composition disclosed in JP H6-53592B contains a large amount of $Al_2O_3$, particularly equal to or more than 3% $Al_2O_3$ from a total amount of $Al_2O_3$ and $TiO_2$ specified as above. In addition, to produce clear glass which is not yellow very much, the glass composition needs to contain a large amount of $Al_2O_3$ without containing TiO2 and unfavorably becomes hard to melt. In an embodiment of the JP H6-53592, a sample of the reinforced glass having a thickness of 3 mm is shown, wherein the surface compressive stress is not enough in spite of its improved condition of reinforcement.

The composition of the glass to be reinforced easily disclosed in aforementioned JP H4-60059B is capable of providing a reinforced glass which is relatively easy to be reinforced in such a manner to control viscosity relative to temperature. However, the temperature difference between the temperatures giving the viscosity of $10^9$ poise and the viscosity of $10^{12}$ poise is as small as 7° C. Therefore the glass composition is so narrow that the glass is hard to be produced.

In a glass composition for manufacturing transparent sheet glass which is disclosed in the PCT (Japanese phase) H8-500811, a total amount of oxides of alkaline earth metals is not greater than 10 wt. % to obtain permeability. However, the amount of oxides of alkaline metals is needed to be increased to keep viscosity, which reduces durability. Furthermore, particularly, in case of reinforcing a glass plate having a thickness of 3.1 mm or less, a sufficient compressive stress value can not be obtained.

OBJECT AND SUMMARY OF THE INVENTION

It is an object of the present invention to solve the aforementioned conventional problems and to provide glass composition which has a thickness of 3.1 mm or less, and has sufficient surface compressive stress provided without improving the performance of reinforcing process. And it is also an object of the present invention to provide a glass composition which can be reinforced sufficiently and has an excellent performance of controlling solar energy.

The glass composition of the present invention includes;
not smaller than 65 wt. % and smaller than 74 wt. % $SiO_2$;
0–5 wt. % $B_2O_3$;
0.1–2.5 wt. % $Al_2O_3$;
not smaller than 0 wt. % and smaller than 2 wt. % MgO;
5–15 wt. % CaO;
0–10 wt. % SrO;
0–10 wt. % BaO wherein a total amount of MgO, CaO, SrO and BaO
is greater than 10 wt. % and not greater than 15 wt. %;
0–5 wt. % $Li_2O$;
10–18 wt. % $Na_2O$;
0–5 wt. % $K_2O$ wherein a total amount of $Li_2O$, $Na_2O$, and $K_2O$ is between 10 and 20 wt. %; and
0–0.40 wt. % $TiO_2$.

The glass of the present invention is given enough high surface compressive stress by a conventional reinforcing process even when the thickness of the glass plate is thinner than a conventional glass plate.

The glass composition of the present invention provides a glass plate which has a thickness equal to or larger than a conventional glass plate, which has strength as high as a conventional glass plate, and which is reinforced through a reinforcing process having a lower level of reinforcing load or intensity, so that the glass plate can be manufactured at a lower cost than a conventional one.

The glass of the present invention can be dealt with in the same way as a conventional glass, and accordingly the glass can be used not only for a reinforced glass but also a laminated glass, a double-glazing unit and so on.

DETAILED DESCRIPTION OF PREFERRED EMBODIMENT

The glass composition of the present invention can include other colorants, so that the glass may have various solar control performances in addition to excellent reinforcing capability.

In order to have low solar energy transmittance and low ultraviolet transmittance, it is desirable that the glass composition of the present invention includes 0.4–1.9 wt. % total ion oxide expressed as $Fe_2O_3$ (hereinafter, referred to as "T-$Fe_2O_3$"), has not greater than 60% solar energy transmittance and not greater than 30% ultraviolet transmittance defined by ISO at a thickness from 1 to 6 mm.

In order to have visible light transmittance in addition to the solar control performance, it is desirable that the glass composition of the present invention includes 0.4–1 wt. % T-$Fe_2O_3$ and 0.01–0.40 wt. % $TiO_2$, and the glass plate consisting of the glass composition has not less than 70% visible light transmittance measured by the C.I.E. illuminant A (YA) at a thickness from 1 to 6 mm.

In order to have further low ultraviolet transmittance as well as high visible light transmittance, it is desirable that the glass composition of the present invention includes;
0.4–0.65 wt. % T-$Fe_2O_3$ wherein a weight ratio of FeO expressed as $Fe_2O_3$ against T-$Fe_2O_3$ is 20–60%;
not smaller than 0.01 wt. % and smaller than 0.20 wt. % $TiO_2$; and
0.1–2.0 wt. % $CeO_2$, and
the glass has not smaller than 70% visible light transmittance measured by the C.I.E. illuminant A (YA), not greater than 55% solar energy transmittance and not greater than 15% ultraviolet transmittance defined by ISO at a thickness from 3.5 to 5.0 mm.

In order to have the same solar control performance in case of having a thin glass thickness, the glass composition of the present invention includes;
greater than 0.65 wt. % and not greater than 0.90 wt. % T-$Fe_2O_3$ wherein a weight ratio of FeO expressed as $Fe_2O_3$ against T-$Fe_2O_3$ is 20–60%;
0.01–0.40 wt. % $TiO_2$; and
greater than 1.4 wt. % and not greater than 2.0 wt. % $CeO_2$, and
the glass has not smaller than 70% visible light transmittance measured by the C.I.E. illuminant A (YA);
not greater than 55% solar energy transmittance; and
not greater than 15% ultraviolet transmittance defined by ISO, at a glass thickness from 1.8 to 4 mm.

In order to provide a preferable shade for the glass, the glass composition of the present invention preferably includes;
smaller than 0.005 wt. % CoO;
not greater than 0.01 wt. % NiO; and
not greater than 0.001 wt. % Se.

In order to have a deep green or gray shade, low visible light transmittance, low solar energy transmittance and low ultraviolet transmittance, it is desirable that the glass composition of the present invention includes,
0.9–1.9 wt. % T-$Fe_2O_3$;

0.005–0.05 wt. % CoO;
0–0.2 wt. % NiO; and
0–0.005 wt. % Se, and
the glass has;
10–65% visible light transmittance measured by the C.I.E. illuminant A (YA);
not greater than 50% solar energy transmittance; and
not greater than 15% ultraviolet transmittance defined by ISO, at a glass thickness from 1.8 to 5.0 mm.

The glass composition of the present invention will be described in more detail hereinafter. It should be noted that compositions will be represented with percent by weight.

$SiO_2$ is a principle component for forming skeleton of glass. Less than 65% $SiO_2$ lowers the durability of the glass and more than 74% $SiO_2$ raises the melting temperature of the glass so high. $SiO_2$ is preferable not to exceed 70%.

$B_2O_3$ is a component for improving the durability of the glass, prompting to melt, and yet enhancing the ultraviolet absorption. $B_2O_3$ should be less than 5%, since the light transmittance thereof drops not only in the ultraviolet region but also in the visible light region so that the glass has a yellow tint, and furthermore, difficulties during molding are caused due to the vaporization of $B_2O_3$.

$Al_2O_3$ improves the durability of the glass. As the amount of $Al_2O_3$ is smaller than 0.1%, the liquidus temperature of the glass increases. Too much amount of $Al_2O_3$ makes the glass hard to melt, and also reduces the mean linear expansion coefficient and reinforcing capability of the glass. $Al_2O_3$ is preferable to be in the range of not greater than 2.5%.

MgO, CaO, SrO and BaO improve the durability of the glass and adjust the liquidus temperature and the viscosity during moldings. Less than 2% MgO and more than 10% of the total amount of above alkaline earth oxides increase thermal stress coefficient and improve reinforcing capability.

When MgO is not smaller than 2%, sufficiently high thermal stress coefficient is hard to be obtained and furthermore, a liquidus temperature raises. The liquidus temperature raises also when CaO is less than 5% or more than 15%. Though SrO and BaO are introduced in the glass in such a manner that SrO and BaO replace MgO and CaO, it is not desirable that the total amount of SrO and BaO exceeds 10% because SrO and BaO are more expensive than MgO and CaO.

When the total of oxides of alkaline earth metals is not greater than 10%, enough thermal stress coefficient is hard to be obtained and furthermore, the durability of the glass is lowered because oxides of alkaline metals should be added in order to keep a liquidus temperature and viscosity of the glass during molding. When the total of oxides of alkaline earth metals exceeds 15%, the liquidus temperature raises and the density of the glass is increased which are not preferable for the production of the glass. The preferable range of the total of oxides of alkaline earth metals is less than 12%.

$Li_2O$, $Na_2O$ and $K_2O$ prompt the glass to melt, and a small amount thereof in the glass increases a thermal stress coefficient without lowering the durability of the glass. The efficiency of promotion of melting becomes poor when $Na_2O$ is less than 10% or the total of $Li_2O$, $Na_2O$ and $K_2O$ is less than 10%, while the durability of the glass is lowered when $Na_2O$ exceeds 18% or the total of $Li_2O$, $Na_2O$ and $K_2O$ exceeds 20%. $Li_2O$ and $K_2O$ are preferable not to exceed 5% because they are more expensive than $Na_2O$.

$TiO_2$ can be added in a small amount to lower the liquidus temperature of the glass. $TiO_2$ is also a component for absorbing the ultraviolet ray. The upper limit of $TiO_2$ is 0.40% because the glass becomes easy to have a yellow tint with the increase of $TiO_2$.

Iron oxide is present in both the form of $Fe_2O_3$ and the form of FeO in the glass. $Fe_2O_3$ is a component for absorbing the ultraviolet ray and FeO is a component for absorbing infrared light.

The total amount of iron oxide expressed as $Fe_2O_3$ (hereinafter, referred to as "T-$Fe_2O_3$") included in the glass composition of the present invention is preferably 0.4–1.9%.

The glass including T-$Fe_2O_3$ in this range has such solar control performance as not greater than 60% of the solar energy transmittance and not greater than 30% of the ultraviolet transmittance defined by ISO at a thickness of 1–6 mm. $Fe_2O_3$ of less than 0.4% will reduce the ultraviolet and infrared absorptivity of the glass.

The glass containing T-$Fe_2O_3$ of greater than 1.9%, when it is melted in a glass melting furnace, absorbs a lot of radiant heat from a flame at the upper surface of the melted glass, so that the glass near the bottom of the melting furnace is not heated enough. More than 1.9% T-$Fe_2O_3$ also makes the specific gravity of the glass too large.

The glass of the present invention can exhibit various solar control performance according to the uses and objects of the glass by including other colorants in a preferable range in addition to iron oxide. The ultraviolet transmittance is mainly determined by iron oxide, $TiO_2$ and $CeO_2$, the solar energy transmittance is mainly determined by iron oxide, and the visible light transmittance is mainly determined by iron oxide, NiO and CoO.

When the glass of the present invention has both high visible light transmittance and low ultraviolet and infrared transmittance, the glass composition includes preferably 0.4–1% T-$Fe_2O_3$ and 0.01–0.40% $TiO_2$. In this case, the glass can have not less than 70% visible light transmittance measured by the C.I.E. illuminant A (YA) at a glass thickness from 1 to 6 mm.

For improving ultraviolet absorptivity furthermore, the glass includes preferably 0.1–2.0% $CeO_2$ and has a 20–60% ratio of FeO expressed as $Fe_2O_3$ against T-$Fe_2O_3$ (hereinafter, referred to as "FeO ratio").

When the glass has high visible light transmittance and low ultraviolet transmittance at a glass thickness from 3.5 to 5 mm, the glass includes preferably 0.4–0.65% T-$Fe_2O_3$, not less than 0.01% and less than 0.20% $TiO_2$, 0.1–2.0% $CeO_2$ and 20–60% FeO ratio, and more preferably, greater than 1.4% $CaO_2$. In this case, the glass can have not less than 70% visible light transmittance measured by the C.I.E. illuminant A (YA), not greater than 55% solar energy transmittance and not greater than 15% ultraviolet transmittance defined by ISO at a glass thickness from 3.5 to 5 mm.

The glass including greater than 0.65% and not greater than 0.90% T-$Fe_2O_3$, 0.01–0.40% $TiO_2$, greater than 1.4% and not greater than 2.0% $CeO_2$ and 20–60% FeO ratio can have the same solar control performance as above at a thickness from 1.8 to 4.0 mm.

The glass including one or more than two among CoO, NiO and Se can have preferable shades, wherein CoO is preferably less than 0.005%, NiO is preferably not greater than 0.01% and Se is preferably not greater than 0.001%.

The glass including 0.9–1.9 T-$Fe_2O_3$, 0.005–0.05 CoO, 0–0.2% NiO, 0–0.005% Se and 15–50% FeO ratio can have deep green or gray shade, low visible light transmittance, low solar energy transmittance and low ultraviolet transmittance, so that the glass has 10–65% visible light transmittance measured by the C.I.E. illuminant A (YA), not greater than 50% solar energy transmittance and not greater than 15% ultraviolet transmittance defined by ISO, at a glass thickness from 3.5 to 5 mm.

The physical properties of the glass of the present invention will be described hereinafter.

As the glass has the larger thermal stress coefficient defined by the product of the mean linear expansion coefficient and Young's modulus, the glass will have the larger reinforcing capacity by air blast cooling. When the thermal stress coefficient of the glass having a thickness of 1.8–5.0 nun is not less than 0.71 MPa/° C., the glass can keep the same surface compressive stress as a conventional glass for vehicles. Although high Young's modulus is needed for the thermal stress coefficient since the mean linear expansion coefficient suited to production has an upper limit, glasses have hardly a very high Young's modulus. The upper limit of the thermal stress coefficient will be not greater than 0.90 MPa/° C.

More than $110 \times 10^{-7}/°$ C. mean linear expansion coefficient is not preferred for the production of a glass. That is, when the mean linear expansion coefficient is too high, it is difficult to control a temperature of the glass when the glass formed in the sheet is cooled to the room temperature. The mean linear expansion coefficient is preferably not less than $80 \times 10^{-7}/°$ C., more preferably $80 \times 10^{-7}/°$ C.–$102 \times 10^{-7}/°$ C. to obtain thermal stress coefficient described above.

When the density of the glass is much different from those of conventional glasses, it takes many days to change molten glasses in a furnace. Therefore, the density of the glass is preferably greater than 2.47 g/cm³ but not greater than 2.65 g/cm³, more preferably not greater than 2.60 g/cm³.

Hereinafter, Examples and Comparative Examples will be described referring to Tables.

Tables 1 to 5 slow glass compositions and physical properties of Examples of the present invention, and Table 6 shows glass compositions and physical properties of Comparative Examples. In Table 1 to 6, α shows a mean linear expansion coefficient in a range from 50–350° C., ρ shows density of the glass, E shows Young's modulus, α·E shows a thermal stress coefficient, d shows a thickness of the glass, YA shows a visible light transmittance measured by the C.I.E. illuminant A, TG shows a solar energy transmittance, and Tuv shows an ultraviolet transmittance defined by ISO. All concentrations in Tables are expressed by weight percentage.

A batch of raw material for the glass is prepared by mixing the composition consisting of silica sand, boric acid, dolomite, limestone, strontium carbonate, barium carbonate, soda ash, salt cake, potassium carbonate, lithium carbonate, carbon, ion oxide, titanium oxide, cerium oxide, cobalt oxide, nickel oxide, and selenium metal in proportions shown in Tables. Then, each batch is heated and melted in an electric furnace at 1450° C. After it is melted, the molten glass is cast on a stainless plate and annealed to the room temperature. The glass plates are shaped and polished to have suitable sizes for measuring physical properties.

By measuring thermal expansion glass samples having a shape of column with thermal expansion meter, thermal expansion curves are obtained. Then, the mean linear expansion coefficient α in a range from 50–350° C. are obtained by using the thermal expansion curves.

Velocity of a longitudinal wave $v_l$ and velocity of a transverse wave $v_t$ which transmit in the glass are obtained by sing-around method. Density of the glass ρ is measured by Archimedes method. Modulus of elasticity G and bulk modulus K are calculated by $v_l$, $v_t$ and ρ. Young's modulus E is calculated by G and K. Formulations for calculating G, K and E are as follows:

$$G = \rho v_t^2$$

$$K = \rho(v_l^2 - 4/3 \cdot v_t^2)$$

$$E = 9KG/(G+3K)$$

A visible light transmittance (YA), a solar energy transmittance (TG) and an ultraviolet transmittance (Tuv) defined by ISO of each glass sample with a thickness from 1.8 to 5.0 mm are measured by using the C.I.E. standard illuminant "A". In Examples 21–25, a dominant wavelength (λd) by using the C.I.E. standard illuminant "C", an excitation purity (Pe) and L*, a* and b* by using the C.I.E. chromaticity diagram are measured.

TABLE 1

|  | Example 1 | Example 2 | Example 3 | Example 4 | Example 5 |
|---|---|---|---|---|---|
| $SiO_2$ | 65.0 | 73.2 | 71.7 | 68.2 | 66.4 |
| $B_2O_3$ | — | — | 1.5 | 5.0 | — |
| $Al_2O_3$ | 2.4 | 1.4 | 1.4 | 1.4 | 2.4 |
| MgO | 0.4 | 1.7 | 1.7 | 1.7 | 1.5 |
| CaO | 13.7 | 9.2 | 9.2 | 9.2 | 7.5 |
| SrO | — | — | — | — | 4.2 |
| BaO | — | — | — | — | — |
| $Li_2O$ | — | — | — | — | — |
| $Na_2O$ | 15.8 | 11.8 | 11.8 | 11.8 | 15.5 |
| $K_2O$ | 0.3 | 0.3 | 0.3 | 0.3 | 0.3 |
| $T\text{-}Fe_2O_3$ | 0.63 | 0.63 | 0.63 | 0.63 | 0.62 |
| FeO | 0.15 | 0.18 | 0.19 | 0.17 | 0.19 |
| $TiO_2$ | 0.13 | 0.13 | 0.13 | 0.13 | 0.13 |
| $CeO_2$ | 1.57 | 1.59 | 1.59 | 1.59 | 1.55 |
| FeO ratio | 0.26 | 0.32 | 0.34 | 0.30 | 0.34 |
| α[ × $10^{-7}$/° C.] | 107 | 84 | 85 | 85 | 101 |
| ρ [g/cm³] | 2.57 | 2.51 | 2.51 | 2.49 | 2.62 |
| α · E [MPa/° C.] | 0.81 | 0.61 | 0.61 | 0.62 | 0.73 |
| d [mm] | 3.5 | 3.5 | 3.5 | 3.5 | 3.5 |
| YA [%] | 78.2 | 79.3 | 78.7 | 78.1 | 79.1 |
| TG [%] | 55.0 | 54.4 | 54.1 | 54.5 | 54.4 |
| Tuv [%] | 8.7 | 12.5 | 11.9 | 10.0 | 10.2 |

TABLE 2

|  | Example 6 | Example 7 | Example 8 | Example 9 | Example 10 |
|---|---|---|---|---|---|
| $SiO_2$ | 65.6 | 69.5 | 66.8 | 67.9 | 67.9 |
| $B_2O_3$ | — | — | — | — | — |
| $Al_2O_3$ | 2.4 | 2.5 | 2.4 | 2.4 | 2.4 |
| MgO | 1.5 | 1.6 | 1.6 | 1.5 | 1.5 |
| CaO | 7.4 | 10.1 | 9.7 | 9.2 | 9.2 |
| SrO | — | — | — | — | — |
| BaO | 4.9 | — | — | — | — |
| $Li_2O$ | — | 2.5 | — | — | — |
| $Na_2O$ | 15.7 | 11.1 | 13.2 | 16.9 | 16.9 |
| $K_2O$ | 0.3 | 0.3 | 4.1 | 0.3 | 0.3 |
| $T\text{-}Fe_2O_3$ | 0.61 | 0.64 | 0.62 | 0.62 | 0.62 |
| FeO | 0.19 | 0.18 | 0.21 | 0.20 | 0.20 |
| $TiO_2$ | 0.13 | 0.13 | 0.13 | 0.15 | 0.15 |
| $CeO_2$ | 1.53 | 1.62 | 1.56 | 1.16 | 1.16 |
| FeO ratio | 0.42 | 0.35 | 0.38 | 0.36 | 0.36 |
| α[ × $10^{-7}$/° C.] | 102 | 97 | 102 | 104 | 104 |
| ρ [g/cm³] | 2.65 | 2.57 | 2.58 | 2.56 | 2.55 |
| α · E [MPa/° C.] | 0.74 | 0.73 | 0.74 | 0.77 | 0.77 |
| d [mm] | 3.5 | 3.5 | 3.5 | 3.9 | 4.8 |
| YA [%] | 80.5 | 79.0 | 78.4 | 76.4 | 71.9 |
| TG [%] | 55.2 | 54.7 | 51.7 | 50.2 | 42.7 |
| Tuv [%] | 10.6 | 8.8 | 11.7 | 11.3 | 8.4 |

TABLE 3

|  | Example 11 | Example 12 | Example 13 | Example 14 | Example 15 |
|---|---|---|---|---|---|
| $SiO_2$ | 67.5 | 67.5 | 69.0 | 69.0 | 68.8 |
| $B_2O_3$ | — | — | — | — | — |

TABLE 3-continued

| | Example 11 | Example 12 | Example 13 | Example 14 | Example 15 |
|---|---|---|---|---|---|
| $Al_2O_3$ | 2.4 | 2.4 | 2.4 | 2.4 | 2.4 |
| MgO | 1.4 | 1.4 | 1.6 | 1.6 | 1.6 |
| CaO | 9.1 | 9.1 | 9.2 | 9.2 | 9.2 |
| SrO | — | — | — | — | — |
| BaO | — | — | — | — | — |
| $Li_2O$ | — | — | — | — | — |
| $Na_2O$ | 16.8 | 16.8 | 15.2 | 15.2 | 15.1 |
| $K_2O$ | 0.3 | 0.3 | 0.7 | 0.7 | 0.7 |
| $T\text{-}Fe_2O_3$ | 0.78 | 0.78 | 0.62 | 0.62 | 0.62 |
| FeO | 0.24 | 0.24 | 0.20 | 0.20 | 0.20 |
| $TiO_2$ | 0.29 | 0.29 | 0.15 | 0.15 | 0.10 |
| $CeO_2$ | 1.44 | 1.44 | 1.16 | 1.16 | 1.41 |
| FeO ratio | 0.34 | 0.34 | 0.36 | 0.36 | 0.36 |
| $\alpha[ \times 10^{-7}/ °C.]$ | 104 | 103 | 98 | 99 | 99 |
| $\rho\ [g/cm^3]$ | 2.55 | 2.55 | 2.55 | 2.54 | 2.55 |
| $\alpha \cdot E\ [MPa/°C.]$ | 0.77 | 0.76 | 0.73 | 0.74 | 0.73 |
| d [mm] | 2.6 | 3.5 | 3.9 | 4.8 | 3.9 |
| YA [%] | 74.9 | 71.8 | 74.8 | 71.1 | 75.1 |
| TG [%] | 46.8 | 41.9 | 46.0 | 40.4 | 47.4 |
| Tuv [%] | 11.1 | 9.0 | 12.1 | 9.5 | 10.6 |

TABLE 4

| | Example 16 | Example 17 | Example 18 | Example 19 | Example 20 |
|---|---|---|---|---|---|
| $SiO_2$ | 68.8 | 68.8 | 68.6 | 68.6 | 68.4 |
| $B_2O_3$ | — | — | — | — | — |
| $Al_2O_3$ | 2.4 | 2.4 | 2.4 | 2.4 | 2.4 |
| MgO | 1.6 | 1.6 | 1.6 | 1.6 | 1.6 |
| CaO | 9.2 | 9.2 | 9.2 | 9.1 | 9.1 |
| SrO | — | — | — | — | — |
| BaO | — | — | — | — | — |
| $Li_2O$ | — | — | — | — | — |
| $Na_2O$ | 15.1 | 15.1 | 15.1 | 15.1 | 15.1 |
| $K_2O$ | 0.7 | 0.7 | 0.7 | 0.7 | 0.7 |
| $T\text{-}Fe_2O_3$ | 0.62 | 0.67 | 0.78 | 0.78 | 0.88 |
| FeO | 0.20 | 0.23 | 0.25 | 0.25 | 0.31 |
| $TiO_2$ | 0.10 | 0.10 | 0.29 | 0.29 | 0.29 |
| $CeO_2$ | 1.41 | 1.41 | 1.44 | 1.44 | 1.60 |
| FeO ratio | 0.36 | 0.38 | 0.36 | 0.36 | 0.39 |
| $\alpha[ \times 10^{-7}/ °C.]$ | 99 | 98 | 99 | 99 | 98 |
| $\rho\ [g/cm^3]$ | 2.54 | 2.55 | 2.55 | 2.55 | 2.55 |
| $\alpha \cdot E\ [MPa/°C.]$ | 0.74 | 0.74 | 0.74 | 0.74 | 0.74 |
| d [mm] | 4.8 | 3.5 | 2.6 | 3.5 | 1.8 |
| YA [%] | 71.8 | 73.9 | 76.3 | 71.7 | 78.2 |
| TG [%] | 42.3 | 45.9 | 50.1 | 42.4 | 54.8 |
| Tuv [%] | 8.3 | 11.8 | 11.7 | 8.5 | 14.8 |

TABLE 5

| | Example 21 | Example 22 | Example 23 | Example 24 | Example 25 |
|---|---|---|---|---|---|
| $SiO_2$ | 69.7 | 69.0 | 69.3 | 69.3 | 69.2 |
| $B_2O_3$ | — | — | — | — | — |
| $Al_2O_3$ | 2.4 | 2.4 | 2.4 | 2.4 | 2.4 |
| MgO | 1.6 | 1.6 | 1.6 | 1.6 | 1.6 |
| CaO | 9.3 | 8.8 | 9.0 | 9.0 | 8.9 |
| SrO | — | — | — | — | — |
| BaO | — | — | — | — | — |
| $Li_2O$ | — | — | — | — | — |
| $Na_2O$ | 15.6 | 15.3 | 15.5 | 15.5 | 15.2 |
| $K_2O$ | 0.8 | 1.4 | 0.8 | 0.8 | 1.4 |
| $T\text{-}Fe_2O_3$ | 0.55 | 1.29 | 1.29 | 1.29 | 1.00 |
| FeO | 0.16 | 0.38 | 0.40 | 0.35 | 0.31 |
| $TiO_2$ | 0.03 | 0.03 | 0.03 | 0.05 | 0.05 |

TABLE 5-continued

| | Example 21 | Example 22 | Example 23 | Example 24 | Example 25 |
|---|---|---|---|---|---|
| $CeO_2$ | — | — | — | — | — |
| FeO ratio | 0.28 | 0.29 | 0.31 | 0.27 | 0.31 |
| NiO | — | 0.0168 | 0.0283 | 0.0730 | — |
| CoO | — | 0.0056 | 0.0105 | 0.0190 | 0.0130 |
| Se | — | — | — | — | 0.0018 |
| $\alpha[ \times 10^{-7}/ °C.]$ | 99.2 | 100.5 | 98.4 | 99.2 | 102.0 |
| $\rho\ [g/cm^3]$ | 2.52 | 2.53 | 2.53 | 2.53 | 2.53 |
| $\alpha \cdot E\ [MPa/°C.]$ | 0.73 | 0.74 | 0.72 | 0.73 | 0.75 |
| d [mm] | 3.5 | 3.5 | 3.5 | 3.5 | 3.5 |
| YA [%] | 81.3 | 50.6 | 41.1 | 25.4 | 34.4 |
| TG [%] | 59.1 | 29.7 | 25.7 | 20.5 | 26.7 |
| Tuv [%] | 29.5 | 10.4 | 11.1 | 10.2 | 10.8 |
| λ d [nm] | 497.4 | 496.7 | 490.7 | 491.9 | 569.7 |
| L* | 92.77 | 77.47 | 71.50 | 58.54 | 65.44 |
| a* | −5.08 | −10.75 | −10.58 | −9.61 | −0.29 |
| b* | 0.17 | 0.07 | −3.53 | −2.32 | 0.72 |

TABLE 6

| | Comparative Example 1 | Comparative Example 2 | Comparative Example 3 | Comparative Example 4 |
|---|---|---|---|---|
| $SiO_2$ | 64.3 | 74.0 | 65.1 | 65.0 |
| $B_2O_3$ | — | — | — | — |
| $Al_2O_3$ | 1.4 | 1.4 | 1.4 | 2.4 |
| MgO | 1.7 | 3.4 | 0.7 | 1.6 |
| CaO | 10.6 | 6.0 | 20.1 | 7.7 |
| SrO | — | — | — | — |
| BaO | — | — | — | — |
| $Li_2O$ | — | — | — | — |
| $Na_2O$ | 19.5 | 12.5 | 10.0 | 20.6 |
| $K_2O$ | 0.3 | 0.3 | 0.4 | 0.3 |
| $T\text{-}Fe_2O_3$ | 0.63 | 0.64 | 0.64 | 0.63 |
| $TiO_2$ | 0.13 | 0.13 | 0.15 | 0.13 |
| $CeO_2$ | 1.59 | 1.60 | 1.61 | 1.57 |
| $\alpha[ \times 10^{-7}/ °C.]$ | 115 | 85 | 94 | 124 |
| $\rho\ [g/cm^3]$ | 2.60 | 2.48 | 2.66 | 2.57 |
| $\alpha \cdot E\ [MPa/°C.]$ | 0.86 | 0.59 | 0.76 | 0.84 |

Examples 1–25 are glasses of which compositions are within the range of claim 1 and also within a range of claim 3. As shown clearly from Tables 1–5, each Example has the mean linear expansion coefficient within the range of claim 11 and the density within the range of claim 12. Among these Examples, Examples 1 and 5–25 have thermal stress coefficient within the range of claim 10 and are excellent in reinforcing capability. Examples 7–25 are glasses of which compositions are within the range of claim 2 which has more preferable range than claim 1.

Examples 1–21 are glasses which have the composition within the range of claim 4 and have relatively high visible light transmittance. Among these Examples, Examples 1–20 have excellent ultraviolet absorptivity. Examples 1–10 and 13–16 include colorants in the range of claim 5 and have such optical properties as not smaller than 70% YA, not greater than 55% TG and not greater than 15% Tuv with a thickness from 3.5 to 5 mm. Examples 11, 12 and 17–20 include colorants in the range of claim 6 and have such optical properties as not smaller than 70% YA, not greater than 55% TG and not greater than 15% Tuv with a thickness from 1.8 to 4.0 mm.

Examples 22–25 are glasses having optical properties shown in claim 9, that is, these Examples include colorants in the claim 8 and have such optical properties as 10–65% YA, not greater than 50% TG and not greater than 15% Tuv with a thickness from 1.8 to 5 mm.

Comparative Example 1 is a glass in which $SiO_2$ and $Na_2O$ are out of scope of the present invention, Comparative Examples 2 and 3 are glasses in which oxides of alkaline earth metals are out of scope of the present invention, and Comparative Example 4 is a glass in which oxides of alkaline earth metals and $Na_2O$ are out of scope of the present invention. Because Comparative Examples 1 and 4 have too high α, they are not suitable for the production of glasses. Because Comparative Example 2 has small α·E, sufficient surface compressive stress can not be obtained. Because Comparative Example 3 has too high density ρ, it is difficult to replace melted glasses in a furnace.

As detailed above, according to the present invention, a glass composition is provided, which can have enough surface compressive stress without improving substantially the reinforcing process in case of reinforcing the glass plate with a thickness of not greater than 3.1 mm, which is thinner than conventional glass plates. The glass composition of the present invention provides a glass plate which has a thickness as large as a conventional glass plate, which has strength as high as a conventional glass plate, and which is reinforced through a reinforcing process having a lower level of reinforcing load or intensity, so that the glass plate can be manufactured at a lower cost than a conventional one. The glass consisting of the glass composition has the excellent solar control performance in addition to the above excellent reinforcing capability.

What is claimed is:

1. A glass composition comprising:
   65 wt. % to less than 74 wt. % $SiO_3$;
   0–5 wt. % $B_2O_3$;
   0.1–2.5 wt. % $Al_2O_3$;
   0.4 to less than 2 wt. % MgO;
   5–15 wt. % CaO;
   0–10 wt. % SrO;
   0–10 wt. % BaO wherein a total amount of MgO, CaO, SrO, and BaO is greater than 10 wt. % to 15 wt. %;
   0–5 wt. % $Li_2O$;
   10–18 wt. % $Na_2O$;
   0–5 wt. % $K_2O$ wherein a total amount of $Li_2O$, $Na_2O$ and $K_2O$ is 10–20 wt. %; and
   0–0.40 wt. % $TiO_2$,
   wherein a product of a mean linear expansion coefficient if a range of 50–350° C. and Young's modulus is 0.71–0.90 MPa/° C., and a mean linear expansion coefficient in a range of 50–350° C. is $80 \times 10^{-7}$–$110 \times 10^{-7}$/° C.

2. A glass composition as claimed in claim 1, wherein the glass composition comprises:
   65–70 wt. % $SiO_2$;
   more than 0 wt. % and less than 2 wt. % $B_2O_3$, and
   MgO, GaO, SrO and BaO in a total amount of more than 10 wt. % and less than 12 wt. %.

3. A glass composition as claimed in claim 1, further comprising 0.4–1.9 wt. % of a total iron oxide (T-$Fe_2O_3$) expressed as $Fe_2O_3$, the glass composition with a thickness from 1 to 6 mm having a solar energy transmittance of not greater than 60% and ultraviolet transmittance of not greater than 30% defined by ISO.

4. A glass composition as claimed in claim 1, wherein the glass composition comprises 0.4–1 wt. % total iron oxide (T-$Fe_2O_3$) expressed as $Fe_2O_3$ and 0.01–0.40 wt. % $TiO_2$ and has a visible light transmittance of not smaller than 70% measured by the illuminant "A" with a thickness from 1 to 6 mm.

5. A glass composition as claimed in claim 1, wherein the glass composition comprises
   0.4–0.65 wt. % total iron oxide (T-$Fe_2O_3$) expressed as $Fe_2O_3$ wherein a FeO ratio expressed as $Fe_2O_3$ against the total iron oxide (T-$Fe_2O_3$) is 20–60 wt. %;
   more than 0.01 wt. % and less than 0.20 wt. % $TiO_2$; and
   0.1–2.0 wt. % $CeO_2$, and
   wherein the glass composition with a thickness from 3.5 to 5.0 mm has a visible light transmittance of not smaller than 70%, a solar energy transmittance of not greater than 55% and an ultraviolet transmittance of not greater than 15% defined by ISO when measured by using the illuminant "A".

6. A glass composition as claimed in claim 1, wherein the glass composition comprises:
   greater than 0.65 wt. % and less than 0.90 wt. % total iron oxide (T-$Fe_2O_3$) expressed as $Fe_2O_3$;
   0.01–0.40 wt. % $TiO_2$; and
   greater than 1.4 wt. % and less than 2.0 wt. % $CeO_2$,
   a FeO ratio expressed as $Fe_2O_3$ against the total iron oxide (T-$Fe_2O_3$) is 20–60 wt. %, and
   the glass composition with a thickness from 1.8 to 4.0 mm has a visible light transmittance of not smaller than 70%, a solar energy transmittance of not greater than 55% and an ultraviolet transmittance of not greater than 15% defined by ISO when measured by using the illuminant "A".

7. A glass composition as claimed in claim 1, wherein the glass composition further comprises:
   less than 0.005 wt. % CoO;
   less than 0.01 wt. % NiO; and
   less than 0.001 wt. % Se.

8. A glass composition as claimed in claim 1, wherein the glass composition further comprises:
   0.9–1.9 wt. % T-$Fe_2O_3$;
   0.005–0.05 wt. % CoO;
   0–0.2 wt. % NiO; and
   0–0.005 wt. % Se.

9. A glass composition as claimed in claim 8, wherein the glass composition with a thickness from 1.8 to 5.0 mm has a visible Light transmittance of 10–65%, a solar energy transmittance of not greater than 50% and an ultraviolet transmittance of not greater than 15% defined by ISO when measured by using the illuminant "A".

10. A glass composition as claimed in claim 1, wherein a density measured at room temperature is greater than 2.47 $g/cm^3$ and not greater than 2.65 $g/cm^3$.

* * * * *